United States Patent [19]

Costa Filho

[11] Patent Number: 5,289,561
[45] Date of Patent: Feb. 22, 1994

[54] SUBSEA PIPELINE SYSTEM WITH ELECTRICALLY HEATED FLEXIBLE PIPELINE

[75] Inventor: Fernando H. Costa Filho, Rio de Janeiro, Brazil

[73] Assignee: Petroleo Brasileiro S.A., Rio de Janeiro, Brazil

[21] Appl. No.: 786,838

[22] Filed: Nov. 1, 1991

[30] Foreign Application Priority Data

Nov. 7, 1990 [BR] Brazil ............................. PI9005628

[51] Int. Cl.⁵ .......................... H05B 3/06; H05B 3/58; E03B 7/10; F16L 53/00
[52] U.S. Cl. ..................... 392/478; 392/472; 219/522; 219/535; 219/549; 137/341; 138/33
[58] Field of Search ............... 392/465, 468, 472, 478, 392/480; 219/522, 535, 549; 174/47; 137/341; 138/33, 114, 138

[56] References Cited

U.S. PATENT DOCUMENTS

| | | | |
|---|---|---|---|
| 3,377,463 | 4/1968 | Rolfes | 392/468 |
| 4,402,346 | 9/1983 | Cheetham et al. | 138/129 |
| 4,455,474 | 6/1984 | Jameson et al. | 219/522 |
| 4,525,813 | 6/1985 | Burrage | 174/47 |
| 4,667,084 | 5/1987 | Regge | 138/114 |
| 5,024,252 | 6/1991 | Ochsner | 138/130 |
| 5,176,179 | 1/1993 | Bournazel et al. | 138/130 |

FOREIGN PATENT DOCUMENTS

8911616 11/1989 World Int. Prop. O. ............ 138/33

*Primary Examiner*—Bruce A. Reynolds
*Assistant Examiner*—Michael D. Switzer
*Attorney, Agent, or Firm*—Sughrue, Mion, Zinn, Macpeak & Seas

[57] ABSTRACT

This invention refers to an electric heating system for subsea flexible pipelines (13) including the circulation of an electric current which runs through the metallic armorings (31) of the flexible pipeline (13), generating energy and dissipating a certain amount of heat to the pipeline (13) and to the fluid contained inside same, maintaining the temperature differential between the environment and the production line, so as not to interrupt the fluid flow.

1 Claim, 8 Drawing Sheets

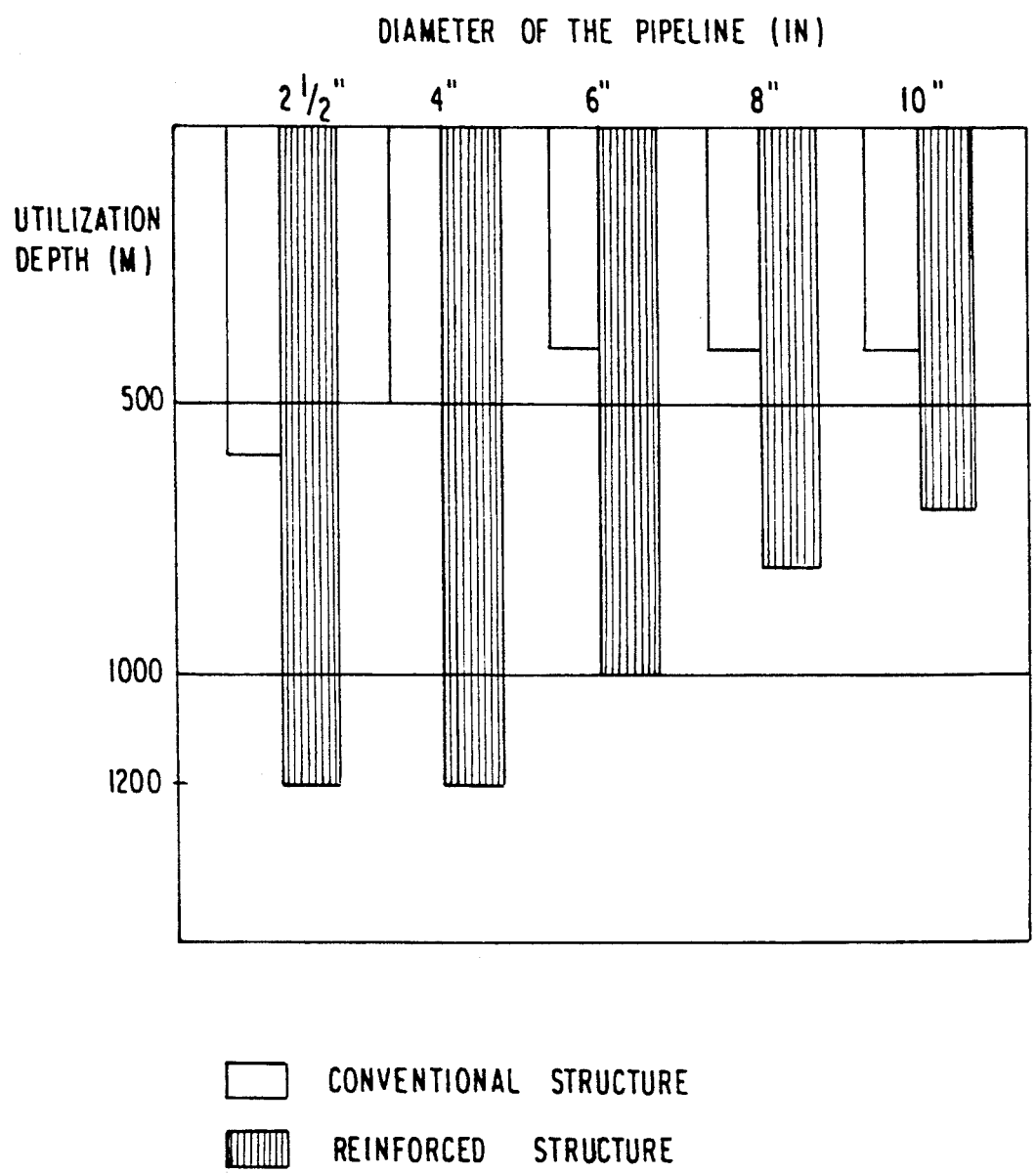

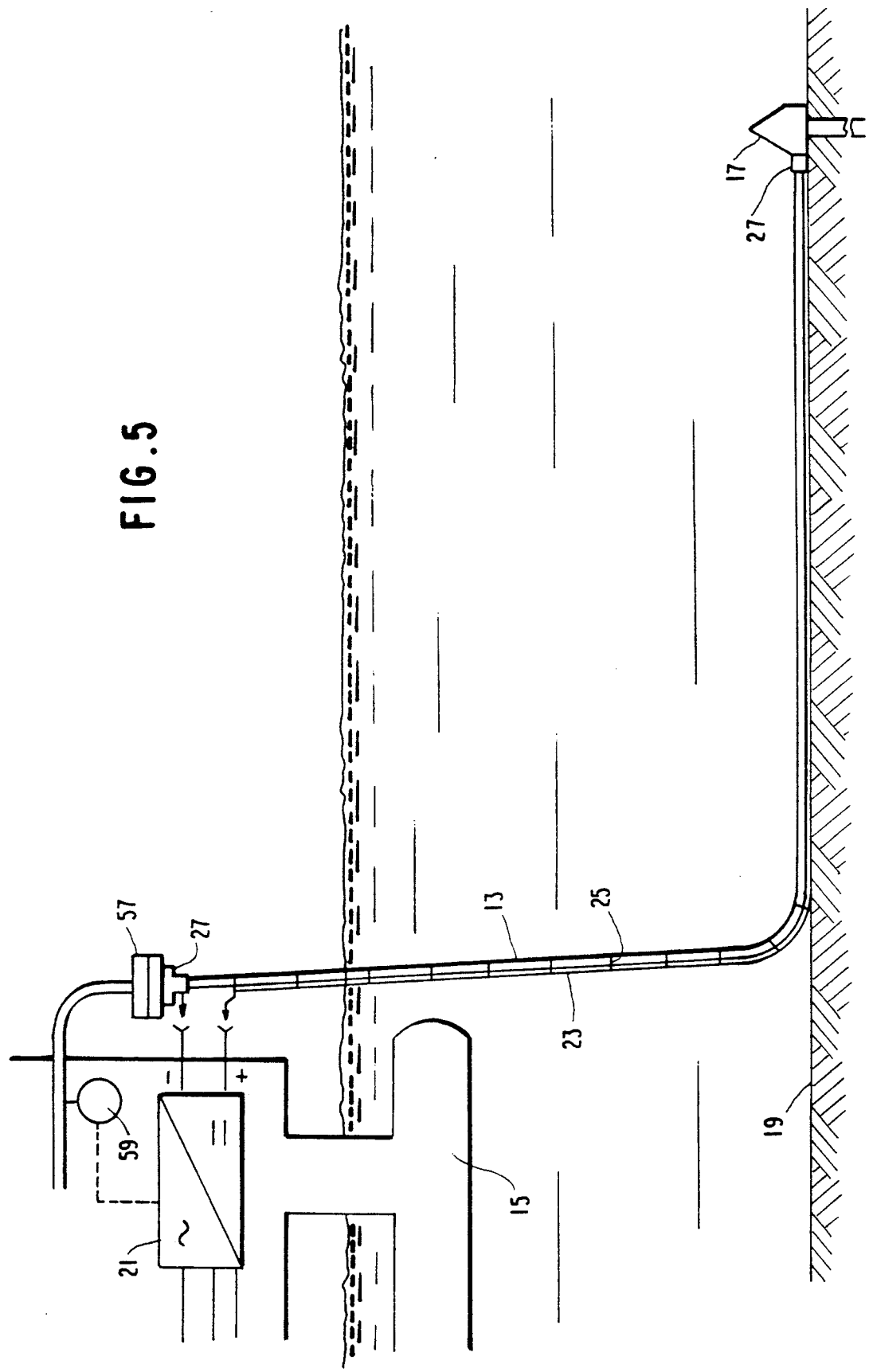

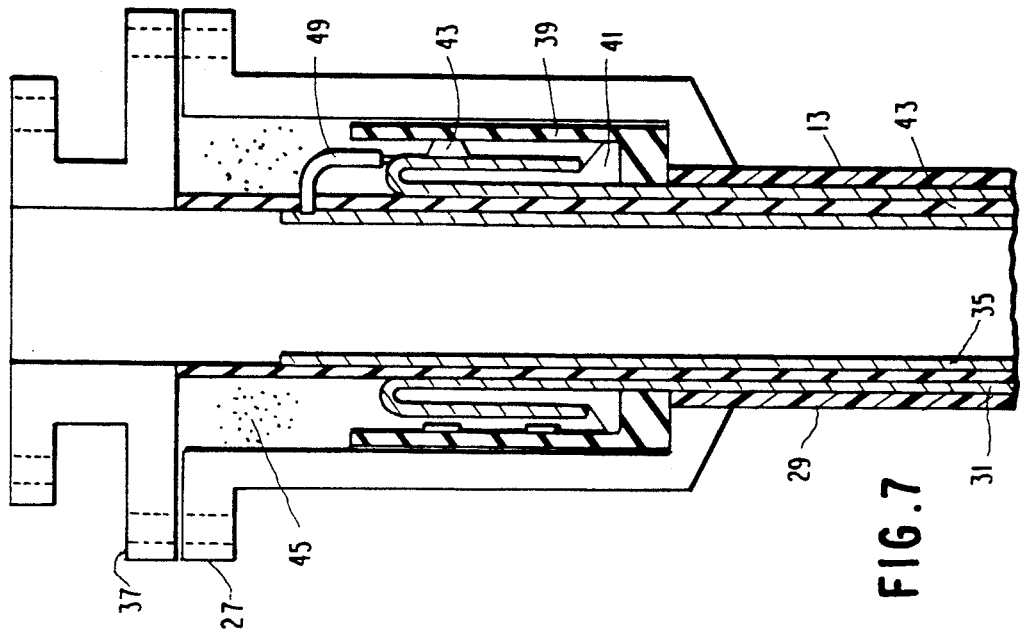
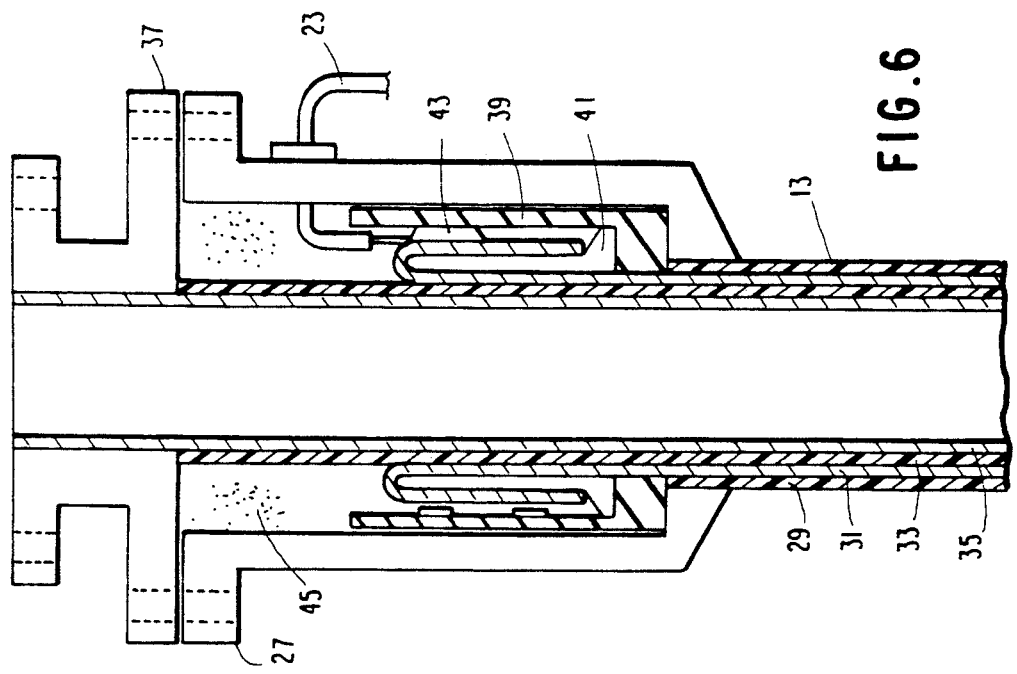

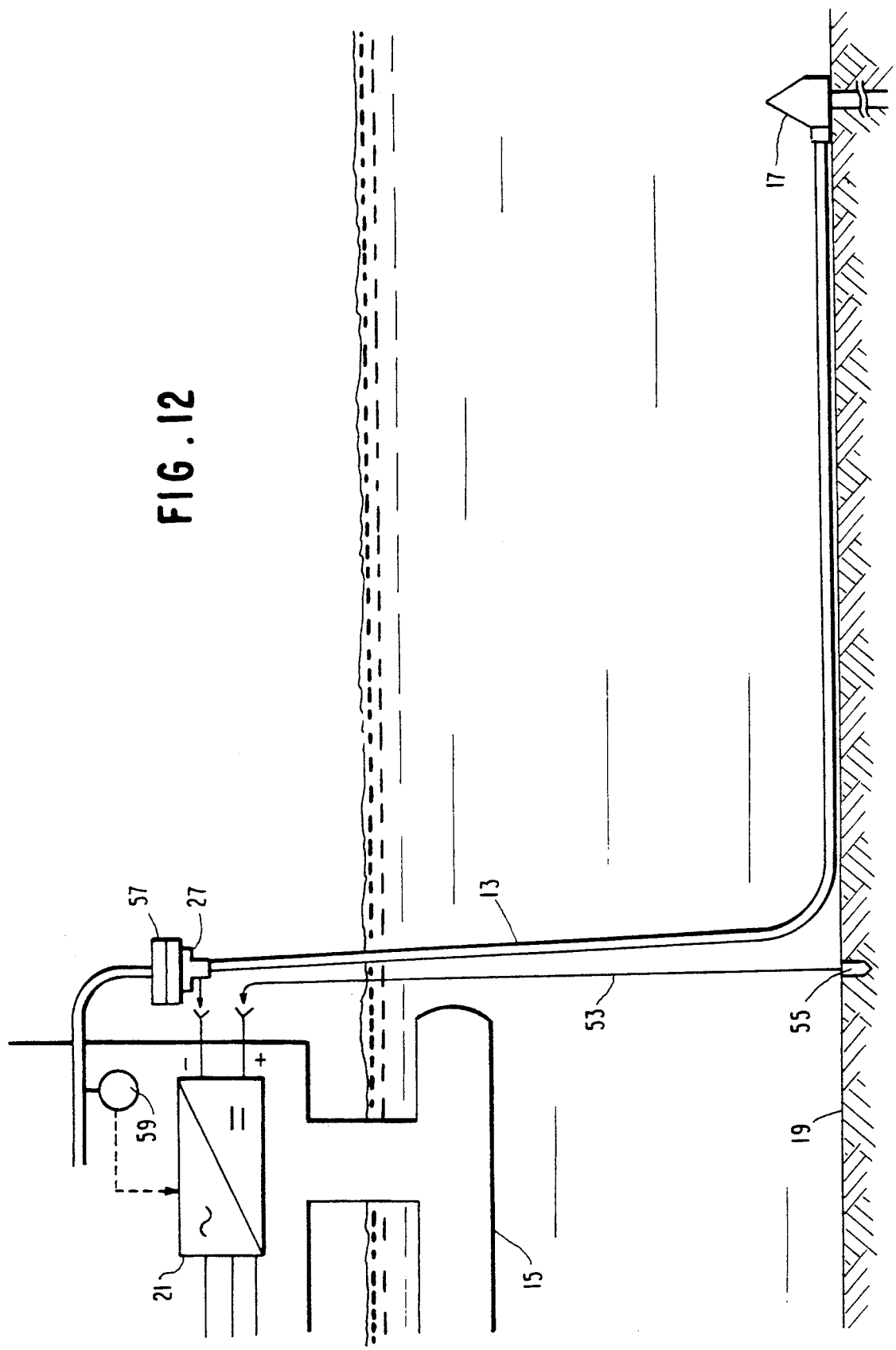

SUBSEA PIPELINE SYSTEM WITH ELECTRICALLY HEATED FLEXIBLE PIPELINE

This invention refers to a uniform heating system of subsea flexible pipelines through electrical current based on the Joule effect, that is, heat is produced by the circulation of the electrical current through the metallic armoring of the pipeline, in which, by heating or maintaining the crude oil at the flowing temperature, it is possible to reduce the pressure drop in the pipeline and increase the flowing period, more oil being, thus, recovered.

One of the difficulties in the production of oil from the reserves located in deep waters is the low temperature which the crude oil acquires as it flows from the well-head to the production platform. This low temperature increases the viscosity of the petroleum and, consequently, increases the pressure drop in the pipeline, reducing the flow rate and the flowing period of the well. The main factors which contribute to this unfavorable situation are the low temperature (below 10° C.) at the seabottom, the large length of the pipelines from the well-heads to the platform, and the high natural viscosity of the crude oil.

In offshore petroleum fields, the production wells are connected, whether to a production platform or to a subsea manifold, by means of pipelines arranged at the seabottom. The choice of the production system to be utilized and the number of wells depend upon various parameters, such as field size and behavior, recovery method, water depth, etc. The wells may produce directly through individual lines up to the platform or converge towards a subsea production manifold, and therefrom to the platform through a single line of larger diameter.

When in production, the crude oil reaches the well-heat at a temperature which is a function, among other things, of the depth of the producing zone (geometric gradient) and the petroleum flow rate (thermal exchanges by conduction and convection). Considering light crude oils, in the configurations mentioned above, the petroleum flows easily up to the production platform through a subsea pipeline without thermal insulation and without heating. The flow temperature varies depending upon the length of the pipeline and the temperature of the water along the path, which does not impair the flow, due to the high fluidity of said petroleum.

Heavy or viscous crude oils, however, when flown through conventional subsea pipelines, become even more viscous, increasing considerably the pressure drop in the oil pipeline, and production is sometimes impaired.

The thermal insulation of subsea pipelines is a practice which is already being utilized and is already well developed, but which, by itself, In some cases it does not solve the problem of viscous oil flowing, that is, the thermal insulation minimizes the problem but, places of low temperatures and long pipelines, a considerable thermal exchange shall occur, which shall increase the crude oil viscosity and the pressure drop in the pipeline, reducing, consequently, the flowing period of the well.

The main physicochemical characteristics of the petroleum, as its flow is dealt with, are the pour points and the viscosity. Although it is possible to distinguish different types of petroleum, based on these two characteristics, to define the flow method to be utilized, it is recommended that each flow type be individually treated, taking into account the peculiarities of the crude oil and the local conditions. In order to minimize the pressure drop which occurs in the flow of crude oil, three ways exist:

a) increasing the diameter of the pipeline, with a limitation in the diameter of the pipelines for deepwater application;

b) increasing the pumping head; applicable only in places where it is easy to install pumps, such as, for instance, platforms, vessels, etc.;

c) reducing the viscosity of the fluid: this would be reached by means of heating (or maintaining the temperature of) the crude oil in the pipeline.

Considering this last hypothesis, since the viscosity of the fluid drops abruptly as the temperature increases, the relationship is exponential, as shows Andrade's equation below:

$$\mu = A \cdot e^{(B/T)} \qquad (1)$$

where:
$\mu$ = viscosity
A and B are constants
T = temperature
e = 2.718282

In spite of the production cost of flexible pipelines being higher than that of rigid pipelines, the designers of systems of crude oil flow in deeper waters have been giving preference to the utilization of flexible pipelines. The comparative table below helps to understand better this preference for flexible pipelines.

TABLE I

| CHARACTERISTIC | FLEXIBLE | RIGID |
| --- | --- | --- |
| Installation time | shorter | longer |
| Production cost | higher | lower |
| Installation cost | shorter | longer |
| Capacity of accommodation at the seabed | larger | smaller |
| Possibility of recovery and reutilization | yes | no |

Flexible pipelines are widely used all over the world. Several manufacturers exist, each one with a design which is defined by the configuration of the structures and by the material utilized. These flexible pipelines are basically formed by alternate layers of steel spirals intercalated with layers of an insulating material, such as, for instance, a polyamide-based elastomer. The internal steel layer is interlocked, whereas the outermost layer is constituted by a crossed armoring, with the purpose of providing the pipeline with a stronger structural reinforcement, this whole ensemble being coated by a polyamide layer.

Therefore, an object of this invention is the provision of a uniform heating system for subsea flexible pipelines through the circulation of an electric current which crosses the steel armorings of the flexible pipeline, generating energy and dissipating a certain amount of heat to the pipeline and to the fluid contained inside same, maintaining the temperature differential between the environment and the production line, so as not to interrupt the fluid flow.

This invention refers to an electric heating system for subsea flexible pipelines which includes the provision of an electric unit consisting of a controlled rectifying unit, which is the source of current, an electric cable positioned in parallel with the flexible pipeline for the return of the current, and two terminal connectors which electrically isolate the double reinforced crossed armoring, the electric current being conducted by the traction armoring and returning by the electric cable installed out of the flexible pipeline.

Still in accordance with this invention, the electric heating system for subsea flexible pipelines includes the provision of an electric unit consisting of a controlled rectifying unit, which is the source of current, an electric cable for the return of the current having in its extremity, grounded at the seabottom, an electrode (anode) and two terminal connectors, the return of the current, both in case of conduction by the traction armoring and by the internal carcase, being carried out through the electrode installed at the seabottom and connected to the platform.

In addition, other modalities of isolation and electric connections of the layers of the flexible pipelines are provided in accordance with this invention, which shall be better detailed further on.

The characteristics and advantages of this invention shall become more evident as from the detailed description of the invention as considered together with the Figures which are included in this specification.

FIG. 3 is a view of a graph showing the variation of the utilization depth (m) with the diameter of the pipeline (in), a limitation in the diameter of the pipelines existing for application in deep waters;

FIG. 5 is an illustrative view of the electric heating system for subsea flexible pipelines with the electric cable for the return of the current positioned in parallel with the flexible pipeline;

FIG. 6 is a section view of the flexible pipeline and connector of the system shown on FIG. 5;

FIGS. 7 through 11 are section views showing other modalities of isolation and electric connections of the layers of the flexible pipelines in accordance with the invention;

FIG. 12 is an illustrative view of the electric heating system for subsea flexible pipelines with an electric cable, for the return of the current, having an electrode in its extremity.

Figure 1:
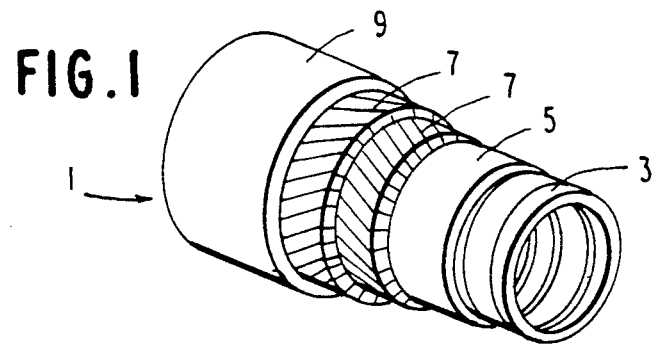
FIG. 1 is a perspective view showing the structure of an already known flexible pipeline which has its installation limited to water depths of nearly 600 m.
Figure 2:
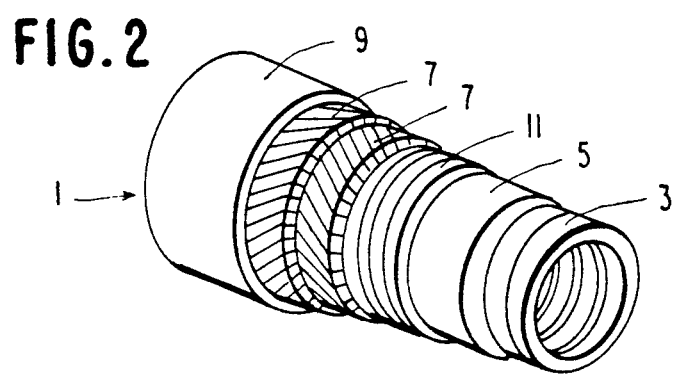
FIG. 2 is a perspective view showing the structure of an already known flexible pipeline for utilization water depths larger than nearly 600 m.

As it can be seen from FIGS. 1 and 2, the flexible pipelines 1 utilized in production systems in case of installations limited to water depths of nearly 600 m are basically constituted by concentric layers, having a spiraled carcase in stainless steel 3, a polyamide layer 5, a double layer of cross armorings 7 and an external polyamide layer 9. For water depths in excess of nearly 600 m, the flexible pipeline 1 receives a reinforcement of a spiraled carcase of zeta wire 11, between the polyamide layer 5 and the double layer of crossed armorings 7, as shown on FIG. 2.

Figure 4:
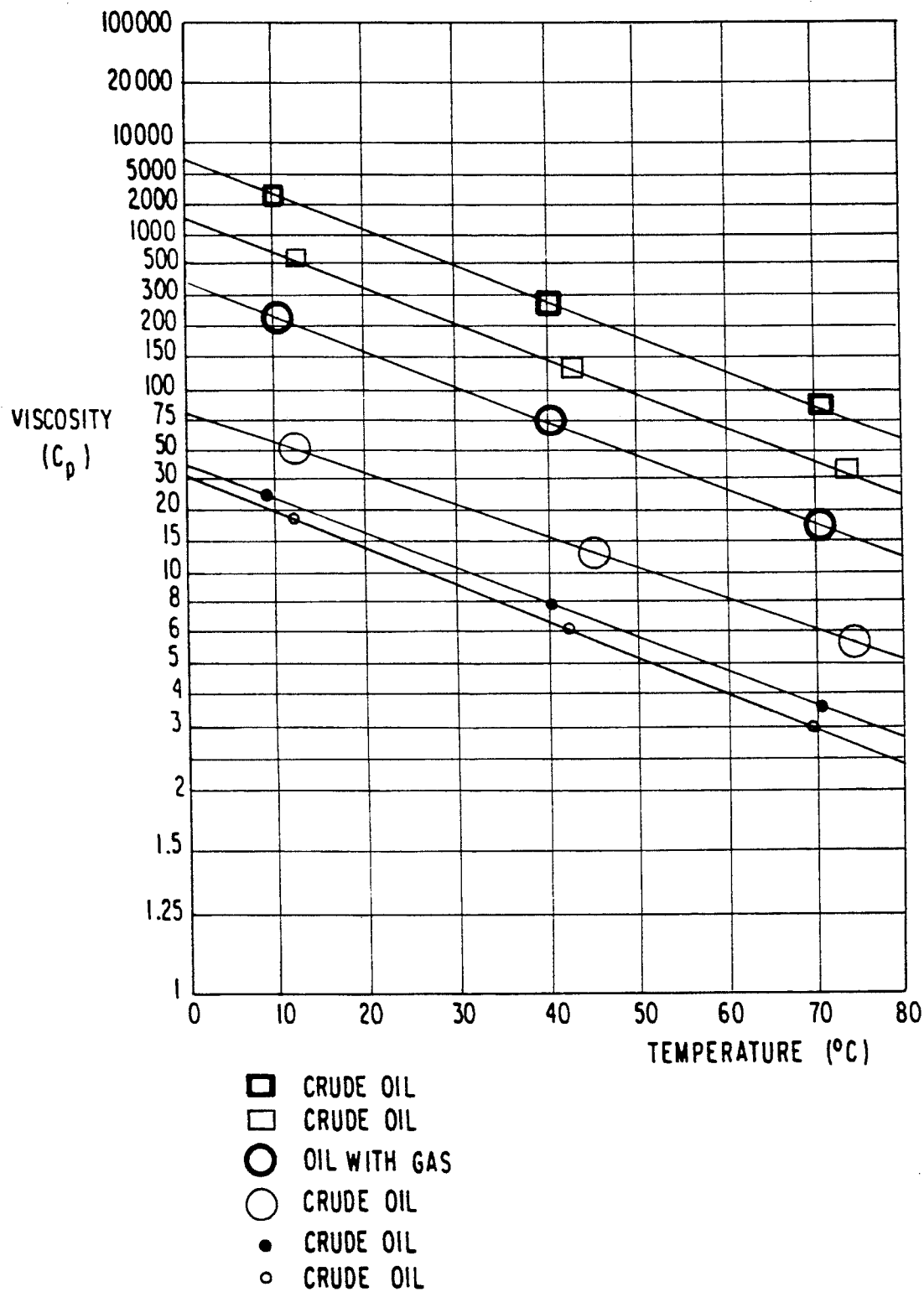
FIG. 4 is a view of a graph exemplifying the variation of viscosity (cp) with temperature for some crude oil types of the Campos Basin, Rio de Janeiro, Brazil.

Returning to equation (1), previously mentioned and making an analysis together with FIG. 4 which exemplifies the variation of viscosity ($\mu$) of the fluid with temperature, it can be noted that, the more viscous the crude oil is, the larger shall be the reduction in its viscosity for a given temperature increase. The temperature of the fluid, in a flow, must be carefully studied, since, in certain situations, it is more economical to heat the fluid than increase the pumping head.

Equation (1) shows that, in a laminar flow, the pressure drop in the pipeline is directly proportional to the viscosity of the fluid.

$$R = \frac{DV}{\mu} \text{ Laminar flow } f = \frac{64}{R} \quad (2)$$

$$\Delta H = f\frac{L}{D} \cdot \frac{V^2}{2g} \therefore \Delta H = \frac{64 \, LV}{D^2 \, 2g}$$

where:
$\Delta H$ = pressure drop
$f$ = friction factor
$L$ = pipeline length
$V$ = fluid velocity
$D$ = pipeline diameter
$g$ = gravitational acceleration
$\mu$ = fluid viscosity Analyzing the graph of FIG. 4 and equation (2) above, it can be seen that, by increasing the temperature of a given flow by 20° C., depending upon the initial temperature and the type of crude oil, a reduction in pressure drop of 50-70% may occur, and the lower the initial temperature of the crude oil and the higher its viscosity, the larger the pressure drop reduction.

Based on the previous data, according to this invention, an electric heating system for subsea flexible pipelines based on the Joule effect is provided, that is, heat is produced by the circulation of electric current through the metallic armoring of the flexible pipeline, the system including, as it can be seen from FIG. 5, the provision of a flexible pipeline, the system including, as it can be seen from FIG. 5, the provision of a flexible pipeline 13 which extends from the platform 15 to a wet christmas tree 17 positioned at the seabottom 19, a controlled rectifying unit 21, which is the source of current, an electric cable 23 positioned in parallel to the flexible pipeline 13 by means of brackets 25 and two terminal connectors 27 which electrically isolate the metallic armoring.

As it can be seen from FIG. 6, the flexible pipeline 13 consists basically of an external polyamide layer 29, a double reinforced crossed armoring 31, a polyamide layer 33 and an internal carcase in stainless steel 35, said flexible pipeline 13 being connected at the top by a connector 27 provided at the top with an adapter 37, internally with an electric isolator 39 and a support 41, said double reinforced crossed armoring 31 of the flexible pipeline 13 folded over and coupled by the bracket 43 mounted inside the connector 27 and internally to the electric isolator 39, with the extremity of armoring 31 arranged on the support 41. An isolating filler 45 lies inside the connector 27. The electric current originating from the controlled rectifying unit 21 runs through the double reinforced crossed armoring 31 (traction armoring) and returns by the electric cable 23 installed externally to the flexible pipeline 13.

Other forms of isolation and electrical connections of the layers of the flexible pipelines are also provided in accordance with this invention. In FIG. 7, the polyamide layer 33 is replaced by an electric isolating layer 47, the electric current being conducted through the double reinforced crossed armoring 31 and returning through the carcase, dispensing, in this case, with the use of the electric cable 23, which represents larger savings in material and an easier handling and installation of the line without any electric cable coupled thereto, the double reinforced crossed armoring 31 and the interlocked carcase in stainless steel 35 being isolated in the line and from the connector 27 and electrically connected by means of the electric cable 49.

Figure 8:
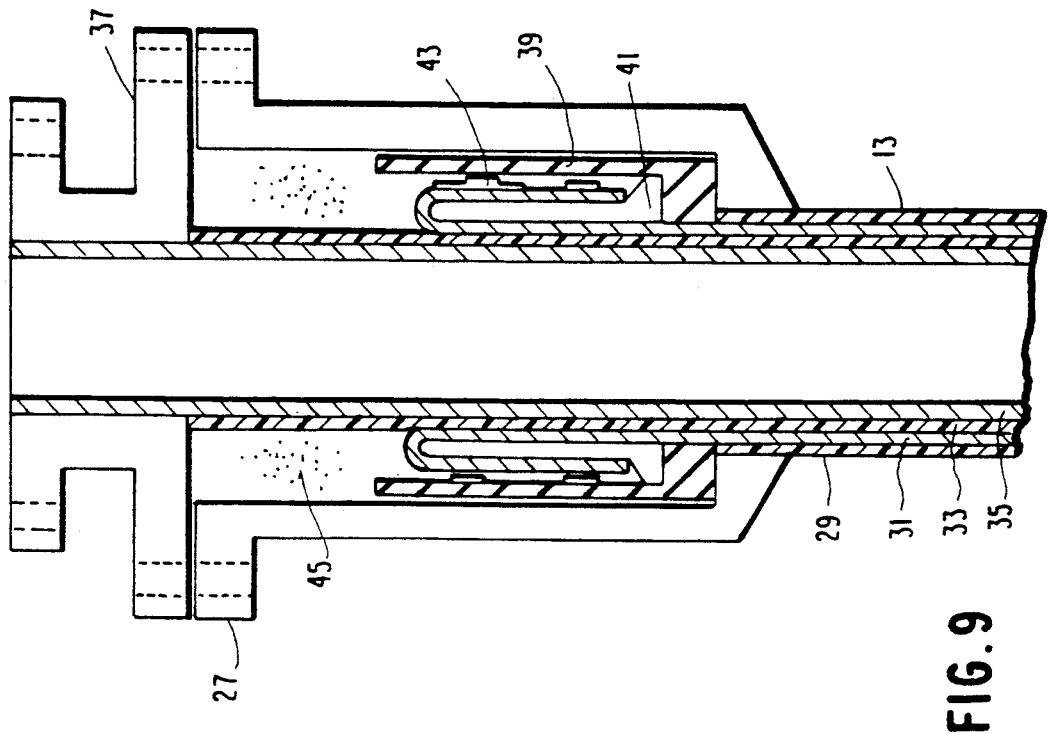

In FIG. 8, the circulation of electric current is carried out through the interlocked carcase in stainless steel 35 with return through the electric cable clamped externally to the flexible pipeline 13, this option offering the advantage of concentrating the generation of heat closer to the inside of the flexible pipeline, the double reinforced crossed armoring 31 and the interlocked carcase in stainless steel 35 being isolated from each other and from the connector 27, with connection of the electric cable 51 with the interlocked carcase in stainless steel 35.

The systems of heating through the internal interlocked carcase offer, as an advantage, in addition to the greater proximity between the thermal source and the inside of the flexible pipeline, another important possibility. It is the case of lines which have been obstructed by paraffinic formations which are to be removed. In this case, compressed air can be injected, so as to open a way along the obstructing material, and, thereafter, water can be injected, so as to fill the spaces opened by the injection of compressed air. Therefore, the current can pass also through the fluid which shall be in electric contact with the internal interlocked carcase.

Figure 9:
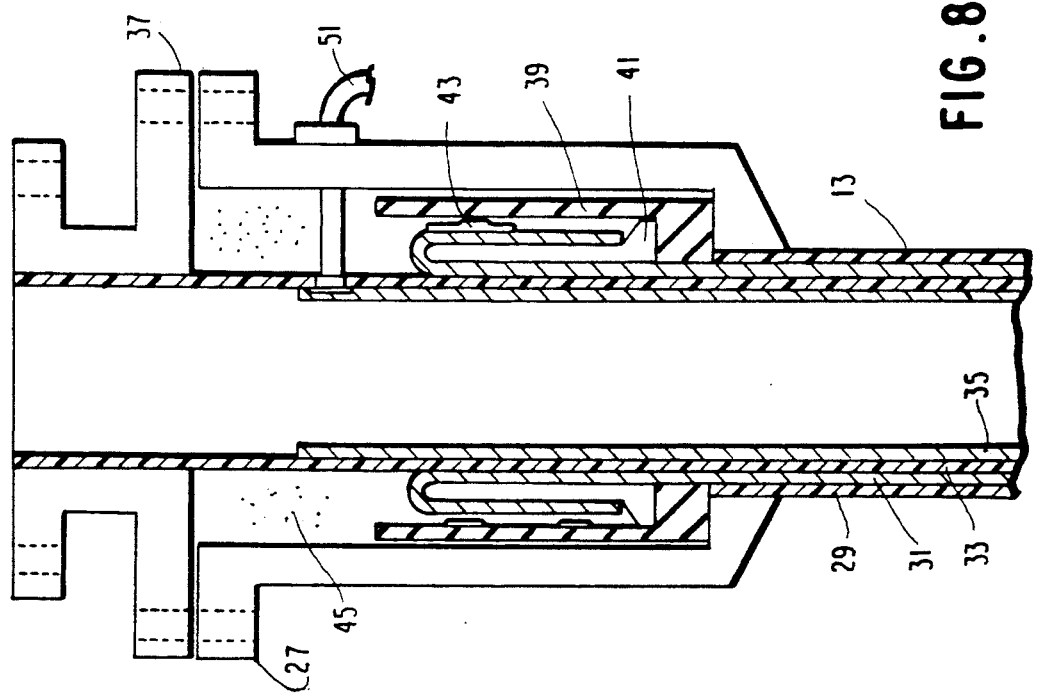
Figure 11:
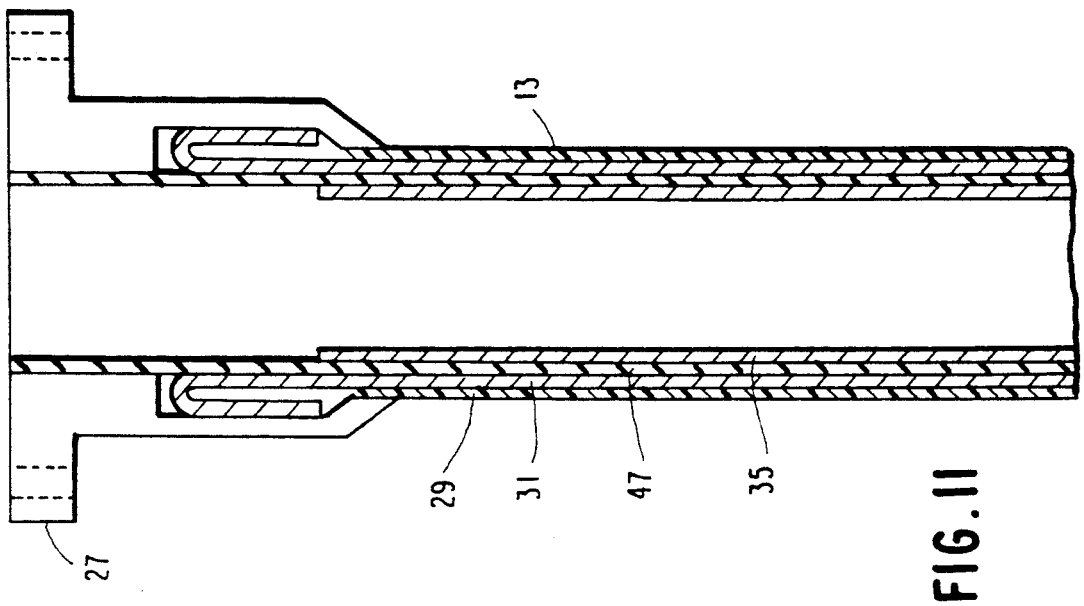
Figure 10:
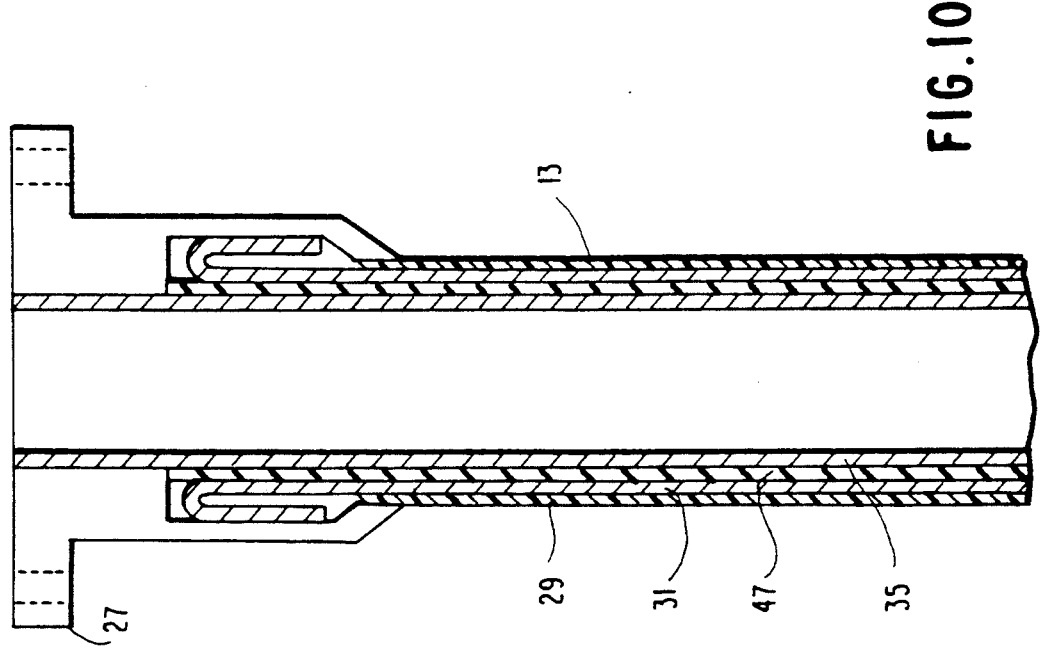

Moreover, as it can be seen in FIGS. 9, 10 and 11, respectively, the double reinforced crossed armoring 31 may be isolated from the interlocked carcase in stainless steel 35 and from the connector 27, with electric connection between the interlocked carcase in stainless steel 35 and the connector 27, the double reinforced crossed armoring 31 and the interlocked carcase in stainless steel 35 may be isolated in the line and electrically connected by means of the connector 27, or else, the double reinforced crossed armoring 31 and the interlocked carcase in stainless steel may be isolated from each other, the double reinforced crossed armoring 31 connected to the connector 27 and the interlocked carcase in stainless steel isolated from the connector 27.

The electric heating system of subsea flexible pipelines, as seen from FIG. 12, includes also, in another embodiment of the invention, the provision of an electric cable 53 presenting in its lower extremity, grounded at the seabottom 19, an electrode (anode) 55. The return of the electric current, both in case of conduction through the double reinforced crossed armoring 31 and through the interlocked carcase in stainless steel 35, is carried out through the electrode 55 installed at the seabottom 19 and connected to the platform 15. This system may prove to be of interest in case of several satellite wells with production lines using a system of heating by means of electric current, since it makes possible to provide a return common to all of them. In addition, it may simplify the detailing of the line fittings, since it dispenses with the isolation of same, that is, the conducting carcase, electrically connected to the fitting, shall close the circuit with the electrode through seawater. This system may eventually even provide with cathodic protection the elements connected to the fitting (WCT—wet christmas tree and the metallic layers themselves of the flexible line).

With respect to the electric current, the systems may operate either in direct or in alternating current, according to the specific convenience for each type of alternative. The use of direct current, however, is more indicated for heating, since the direct current generates more heat for one same peak voltage than alternating current. The direct current requires less isolating material and renders the circuit purely resistive, without capacitive and inductive reactances, thus reducing the impedance.

Figure 13:
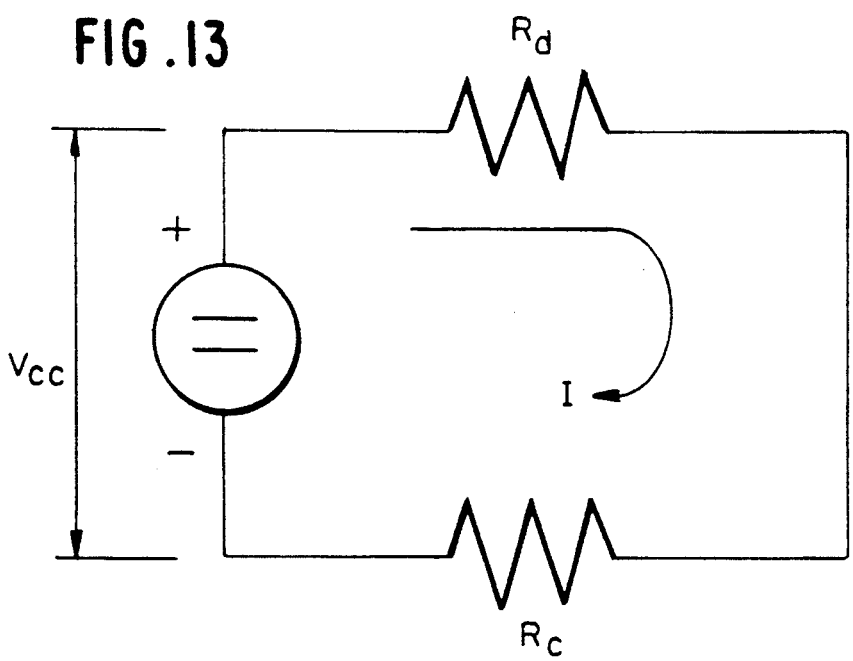
FIG. 13 is an illustrative view of the electric circuit which is purely resistive with a DC source.

As it can be seen from the electric circuit represented on FIG. 13, where:

$V_{cc}$=voltage of direct current applied
$R_d$=Electric resistance of the flexible pipeline
$R_c$=Electric resistance of the cable for return of the current
I=Circulating electric current, the electric circuit is purely resistive with a direct current source.

The $R_c/R_d$ ratio must be as low as possible, since the heat produced in the pipeline and in the cable shall be proportional to their electric cable, one must have this in mind, so as to ensure a high efficiency for the heating. The temperature control of the crude oil is performed by a temperature sensor 59 installed at the crude oil arrival pipeline after the OCDC 57. This sensor sends a signal to the rectifier 21 which shall control the current through the cable. Thus, a continuous adjustment of fluid flow temperature is achieved.

The electric heating system for subsea flexible pipelines, according to this invention, is extremely simple and perfectly under the domain of the national technology. The investments required for its achievement are relatively small and depend basically upon the amount of heat to be supplied, which in its turn shall be minimized as a function of the thermal isolation of the pipeline.

As advantages offered by the heating system object of this invention may be mentioned, among others, the automatic control of crude oil temperature, the easy alteration of the adjusted temperature, the increase in petroleum production as the pressure drop in the flowing pipeline is the limiting factor, the increased field oil recovery, the reduction or elimination of incrustations at the internal pipeline wall, due to the adherence of paraffinic substances.

It must be pointed out that the system herein proposed is not oriented only towards crude oil flow, but can be applied also to gas pipelines, thus achieving the reduction or elimination of hydrate formation, as well as the reduction or elimination of cleaning requirements by means of scrapers or pigs.

I claim:

1. In a subsea pipeline system with electrically heated flexible pipeline comprising:
    a surface platform, a wet christmas tree positioned on a sea bottom, a flexible pipeline extending from said surface platform to said wet christmas tree, the improvement wherein said flexible pipeline comprises, radially inwardly, in order; an external polyamide layer (29), a double reinforced crossed armoring (31), an internal polyamide layer (33) and an internal interlocked stainless steel carcase,
    and said system further comprises means for circulating an electric current through at least the double reinforced cross armoring (31) from said platform to said wet christmas tree, said means for circulation of said electric current including a controlled electrical current rectifying unit (21) at said platform, an electric cable (53) having a lower extremity grounded at said sea bottom (19) via an electrode (55), and wherein said means for circulating electric current through at least said double reinforced crossed armoring (31) comprises means for passing said electrical current through said electric cathode grounded to said sea bottom and said electric cable (53) to said controlled electric current rectifying unit (21) at said surface platform (15).

* * * * *